US006939426B2

(12) United States Patent
Stambridge et al.

(10) Patent No.: US 6,939,426 B2
(45) Date of Patent: Sep. 6, 2005

(54) NOTEPAD AND PROCESS AND APPARATUS FOR MAKING SAME

(75) Inventors: Jon Kristian Stambridge, Blackpool (GB); Christopher Simister, Blackpool (GB); Derek Skinner, Blackpool (GB)

(73) Assignee: Pramic Limited, Lancashire (GB)

( * ) Notice: Subject to any disclaimer, the term of this patent is extended or adjusted under 35 U.S.C. 154(b) by 0 days.

(21) Appl. No.: 10/469,207

(22) PCT Filed: Mar. 1, 2002

(86) PCT No.: PCT/GB02/00919

§ 371 (c)(1),
(2), (4) Date: Aug. 25, 2003

(87) PCT Pub. No.: WO02/070274

PCT Pub. Date: Sep. 12, 2002

(65) Prior Publication Data

US 2004/0074596 A1 Apr. 22, 2004

(30) Foreign Application Priority Data

Mar. 5, 2001 (GB) ............................................ 0105371
Apr. 20, 2001 (GB) ............................................ 0109735

(51) Int. Cl.[7] .......................... B32B 31/12; B32B 31/18

(52) U.S. Cl. ....................... 156/256; 156/263; 156/267; 156/277

(58) Field of Search ................................ 156/250, 256, 156/260, 264, 267, 269, 277, 252, 263; 428/33, 42.1, 77, 80, 84, 88, 89, 192, 211.1, 353, 355 RA; 493/343, 344, 361, 374

(56) References Cited

U.S. PATENT DOCUMENTS

| | | | | |
|---|---|---|---|---|
| 4,662,970 A | | 5/1987 | Bancroft | |
| 5,464,672 A | | 11/1995 | Jackson | |
| 6,153,278 A | * | 11/2000 | Timmerman et al. | 428/40.1 |
| 6,254,960 B1 | | 7/2001 | Chen | |
| 2001/0033077 A1 | | 10/2001 | Chen | |

FOREIGN PATENT DOCUMENTS

| | | |
|---|---|---|
| EP | 0 664 225 A1 | 1/1995 |
| GB | 2 186 840 A | 8/1987 |
| GB | 2 283 454 A | 5/1995 |
| GB | 2 321 429 A | 7/1998 |
| WO | WO 94/14614 | 7/1994 |

* cited by examiner

*Primary Examiner*—Chris Fiorilla
*Assistant Examiner*—Sing P. Chan
(74) *Attorney, Agent, or Firm*—Boyle Fredrickson Newholm Stein & Gratz S.C.

(57) ABSTRACT

The invention relates to a notepad and to a process for manufacturing a notepad comprising providing a paper supply; sequentially feeding single pages from said paper supply to a printing and cutting station; printing on images on pad region of each single page; making at least one irregular cut at the edge of the pad region while leaving at least one straight edge of the pad region uncut; collating the printed and cut pages in a stack of desired quantity; cutting the collated stack along the at least one uncut straight edge of each pad region; and gluing the collated stack along the resulting cut straight edge.

6 Claims, 5 Drawing Sheets

NOTEPAD AND PROCESS AND APPARATUS FOR MAKING SAME

BACKGROUND OF THE INVENTION

1. Field of the Invention

The present invention relates to a process for manufacturing a notepad, in particular a paper notepad, comprising at least one area of irregular shape.

2. Description of the Related Art

Notepads for use in offices, homes and in any number of commercial and non-commercial environments are well known. Generally, notepads consist of a multiplicity, say 50 or 100 sheets of paper glued together at one edge enabling individual sheets of paper to be easily torn off from the main body of the notepad. Some notepads are provided with an adhesive strip along an edge region of each page of the notepad, which adhesive strip retains its adhesive properties after removal from each page of the notepad from the main body. The detached page can then removably adhere to another surface, such as a desk top or computer screen.

Notepads are generally of square or rectangular shape and are frequently manufactured by a simple process of guillotining a plurality of paper sheets to the required shape and size and then gluing together the sheets along one edge.

OBJECTS AND SUMMARY OF THE INVENTION

The object of the present invention is to provide a notepad, and process for making the same, which has at least one area of irregular shape. It is envisaged that the irregularly shaped area of the notepad may be used for decorative or design purposes or for displaying a company logo or trade mark.

According to the present invention, there is provided process for manufacturing a notepad comprising a multiplicity of sheets of a sheet material, each sheet having at least one straight edge region, along which the individual sheets are glued together, and at least one irregularly shaped edge region.

The irregularly shaped edge region may comprise one or more curved regions, one or more straight regions, or a combination of both. The irregularly shaped edge region may be symmetrical or non-symmetrical. The irregular shape is such that it would be impractical or impossible to cut the irregular shape using a guillotine.

Preferably, the sheet material is paper.

Preferably, the notepad of the invention comprises at least 20, for example from about 30 to 200, even more preferably from about 50 to 100 sheets of the sheet material.

Preferably, the irregularly shaped edge region of the notepad defines a shaped area of the notepad which is printed or embossed with a decoration such as a company logo or trade name.

According to the present invention, there is also provided a process for manufacturing a notepad comprising cutting out the irregularly shaped edge region using a cylinder press, in-line cutting tool, platen press or a ram punch, while leaving the at least one straight edge uncut during this step; cutting the at least one remaining straight edge with a guillotine and gluing the sheets together along any straight edge of the notepad.

Further provided in accordance with the invention is a process for manufacturing a notepad comprising:

- providing a paper supply;
- sequentially feeding single pages from said paper supply to a printing and cutting station;
- printing an image on a pad region of each single page;
- making at least one irregular cut at the edge of the pad region whilst leaving at least one straight edge of the pad region uncut;
- collating the printed and cut pages in a stack of desired quantity;
- cutting the collated stack along the at least one uncut straight edge of the pad region; and
- gluing the collated stack along any resulting cut straight edge.

It is possible, using the process of the invention, for a plurality of identical pad pages to be cut from a single sheet of paper. For example, the starting material may be paper of size A2, this being used to provide 8 identical pads of approximate size A5 but with an irregular edge region.

Accordingly, the invention further provides a process for manufacturing a notepad comprising:

- providing a paper supply;
- sequentially feeding single pages from said paper supply to a printing and cutting station;
- printing a plurality of identical images at spaced apart pad regions of each single page;
- making at least one irregular cut at the edge of each spaced apart pad region whilst leaving at least one straight edge of each spaced apart pad region uncut;
- collating the printed and cut pages in a stack of desired quantity;
- cutting the collated stack along the at least one uncut straight edge of each spaced apart pad region; and
- gluing the collated stack along any resulting cut straight edge.

The printing and cutting steps are preferably performed in the same station, for example in a Heidelberg Speedmaster 74 (TM) but could alternatively be separated if desired.

It is important in the process of the invention not to cut the at least one straight edge in the cutting station (which may be a cylinder press, platen press, ram punch or in-line cutting tool, for example) because of the risk otherwise of a multiplicity of cut pad regions becoming separated from each other during said operation.

Preferably, the stacked pages are collated together with backboards which are correspondingly cut to match the cut pages. However, the backboards need not be printed.

The process of the invention may comprise an additional step of further cutting the glued collated stack along one or more further uncut straight edges if, for example, more than one identical image is printed across the width of each single page of the paper supply or if the final pad is to be provided with more than one straight edge. It may also be necessary to finish off the notepad by tearing away any waste paper from the region of the irregular cut.

In one process according to the invention, the initial cutting step is performed using a Heidelberg SBS cylinder cutter, followed by a Polar 78 (TM) guillotine and a gluing machine of known construction. The Heidelberg Speedmaster 74 may be used instead of the Heidelberg SBS. Another alternative cutting machine is the Bobst Autoplaten SP 900-E.

The gluing step in the process of the invention may provide a straightforward adhesive edge for simply holding individual pages of the notepad together, which individual pages are torn off when desired. Alternatively each page may be provided with a re-usable adhesive band enabling a single page to be removed and then stuck to another surface.

BRIEF DESCRIPTION OF THE DRAWINGS

The process and notepad of the invention will now be more fully described with particular reference to the drawings, in which.

DETAILED DESCRIPTION OF THE PREFERRED EMBODIMENTS

Figure 1:
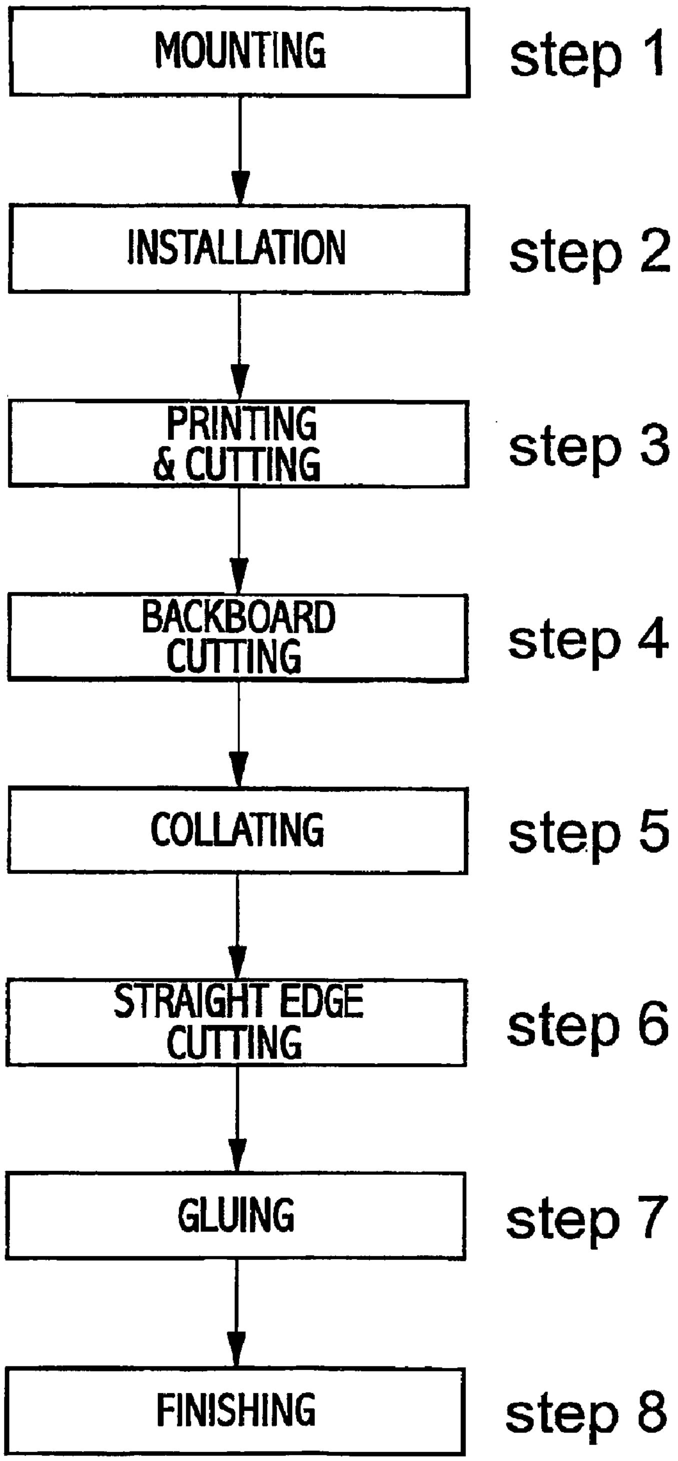
FIG. 1 shows a schematic diagram of one process according to the invention.

Referring to FIG. 1, one process of the invention comprises the steps of mounting a cutting tool on a mylar grid using double sided adhesive. The cutting tool is preferably a flexible metal plate, for example a steel plate, with a raised blade region corresponding to the irregular shape which is required to be cut. The cutting tool may be of equivalent size to the paper supply to be used or may comprise a plurality of identical blades at spaced apart regions of the sheet. A number of cutting tools with different blade configurations are shown in FIGS. 11 to 16. Although FIGS. 11 to 16 show single plates with single blades, it is also possible to provide a plate with multiple identical blades to allow a single paper sheet to be cut to a plurality of individual pad pages.

In the next step shown schematically in FIG. 1, the mylar grid, with the cutting tool mounted thereon, is installed in a printing press (for example the Heidelberg Speedmaster 74 (TM) with coating unit). The installation may be made in, for example, the coating unit of the press and the installed tool held in place by means of suitable clamps.

In the next stage, blank paper is run through the press and, in this example, is printed and cut in the same operation. The desired quantity of sheets are printed, cut and tabbed in the desired amounts.

Figure 2:
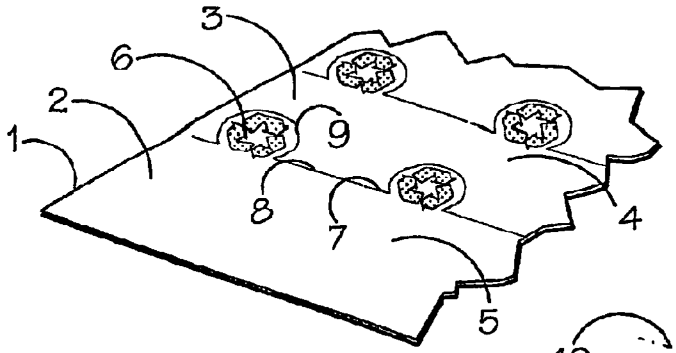
FIGS. 2 to 7 show in schematic form the various stages of manufacture of one notepad according to the invention.

FIG. 2 shows a cutaway section of a single page of size A2 from which 16 pads of approximate size A6 ultimately are to be cut. Only one comer of the page, showing 4 pad pages, are shown in FIG. 2.

In more detail, FIG. 2 shows a single page 1 from a paper supply (not shown) which has been printed and cut to the stage corresponding to step 3 in FIG. 1. The cut away section shown in FIG. 2 shows four pads 2, 3, 4 and 5. Each pad page has an identical image 6 printed thereon, an image which may correspond to a company name or logo, for example. Each pad is also provided with an irregular cut 7 which has both a straight region 8 and a curved region 9. At least one straight edge of each pad remains uncut. In the case of pad 2 the bottom edge and both right hand and left hand edges remain uncut at this stage.

Figure 3:
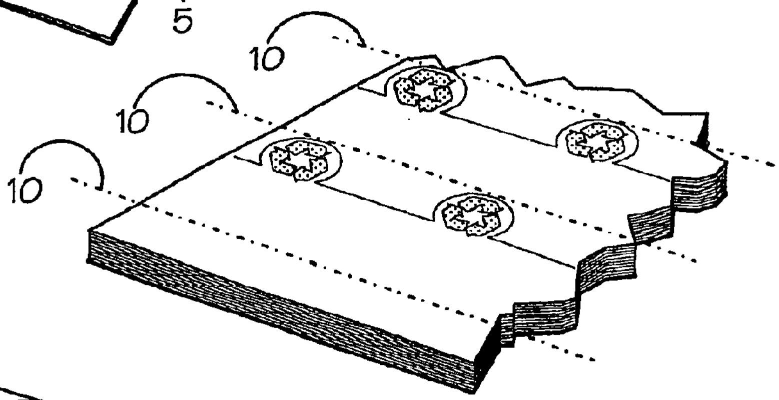

Referring back to FIG. 1, backboards (preferably of cardboard) are cut using the same method as outlined above. However, the backboards remain unprinted. These are then collated together with desired quantities of cut paper sheets as indicated in step 5 of FIG. 1. The resulting collated stack is shown in FIG. 3, wherein the bottom uncut straight edge of each pad is indicated by dotted lines 10.

Figure 4:
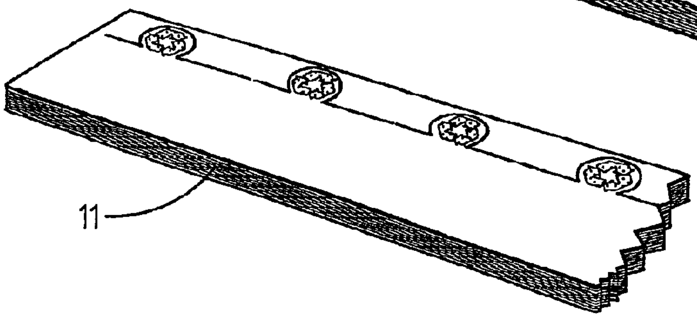

In step 6 of FIG. 1 the uncut straight edge is then cut using a suitable guillotine such as a Polar 78 guillotine and the resulting cut stack is shown in FIG. 4. FIG. 4 shows a longer length than the corresponding FIG. 3.

Figure 5:
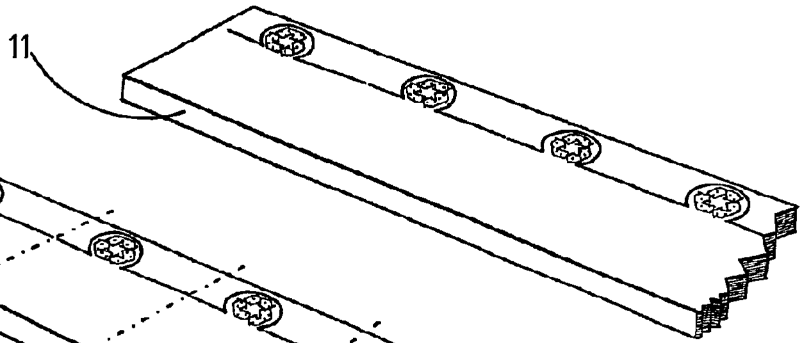

The collated stack is then glued along the cut straight edge 11 as indicated in step 7 of FIG. 1 and shown in FIG. 5.

Figure 6:
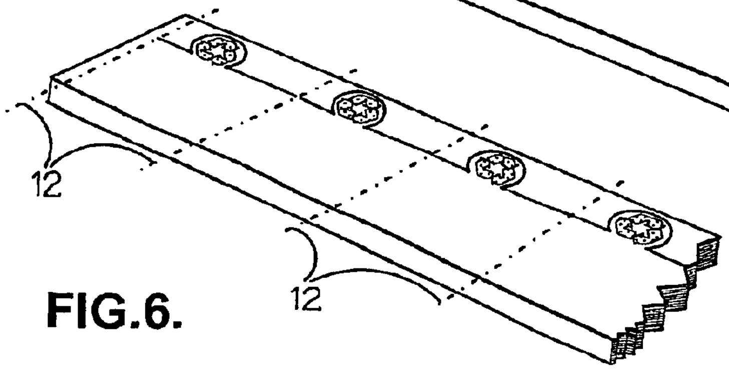
Figure 7:
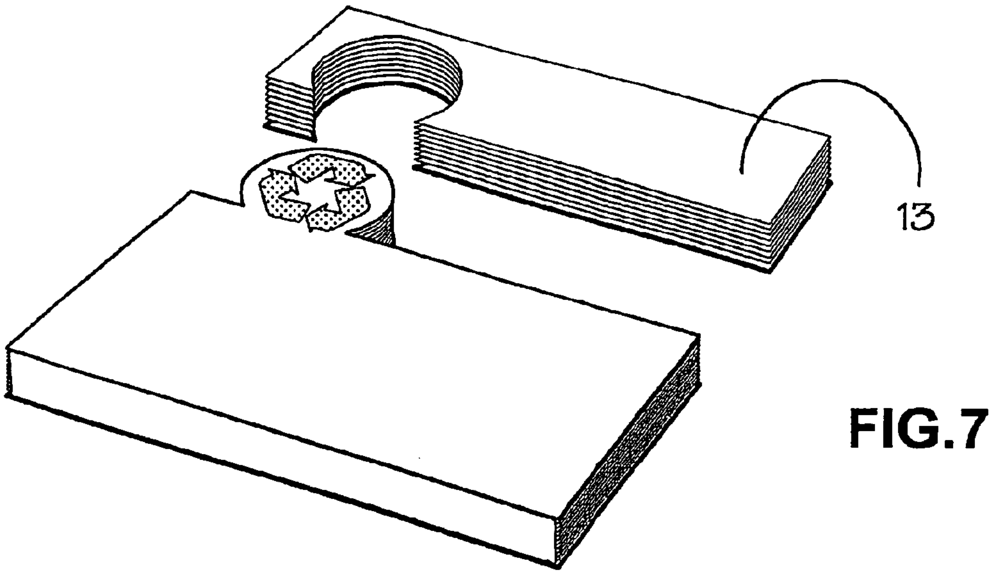
Figure 8:
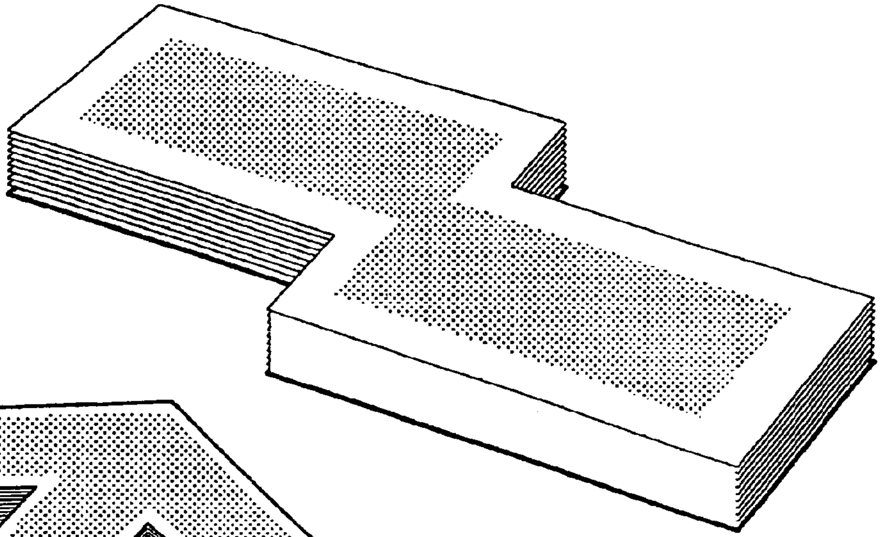
FIGS. 8 and 9 and 10 depict alternative forms of notepad according to the invention.
Figure 9:
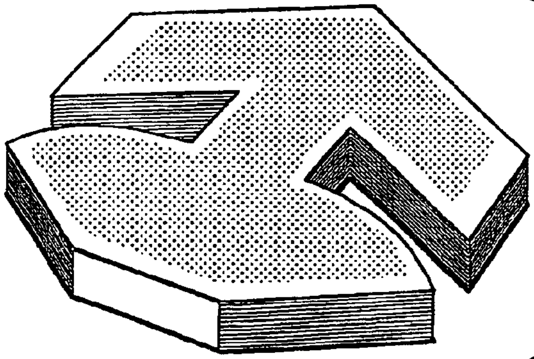
Figure 10:
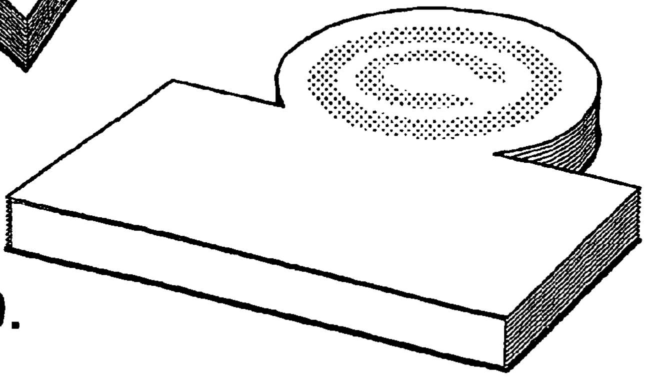
Figure 11:
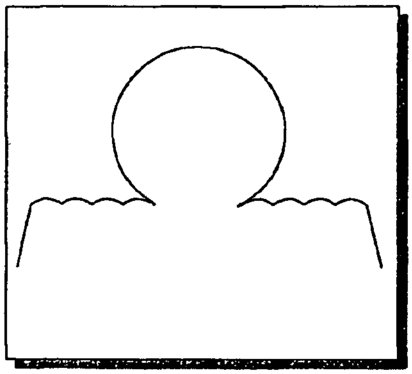
FIGS. 11 to 16 show alternative forms of cutting tool for use in the process of the invention.
Figure 12:
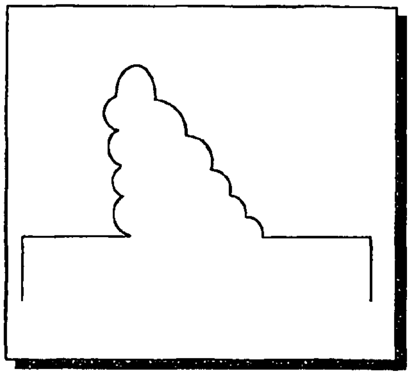
Figure 13:
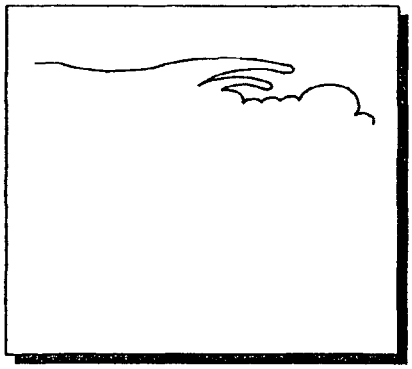
Figure 14:
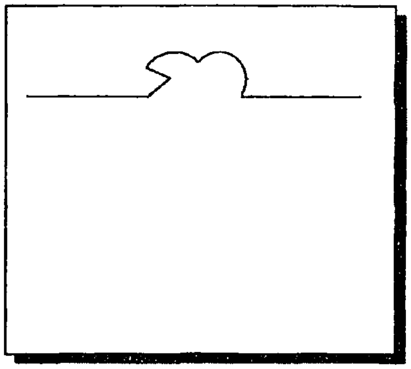
Figure 15:
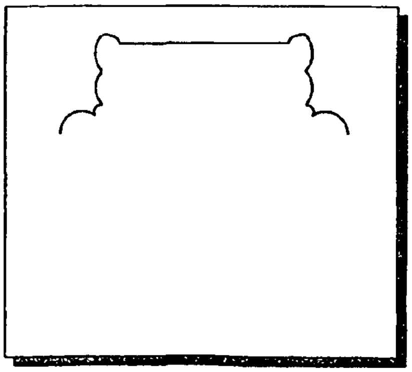
Figure 16:
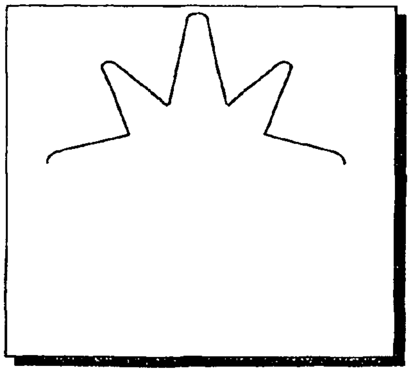

Preparation of the pad is completed by cutting the remaining straight edges shown by dotted lines 12 in FIG. 6 and by tearing off the waste portion 13 shown in FIG. 7. The finished product is shown in FIG. 7 and alternative embodiments are shown in FIGS. 8, 9 and 10.

Figure 17:
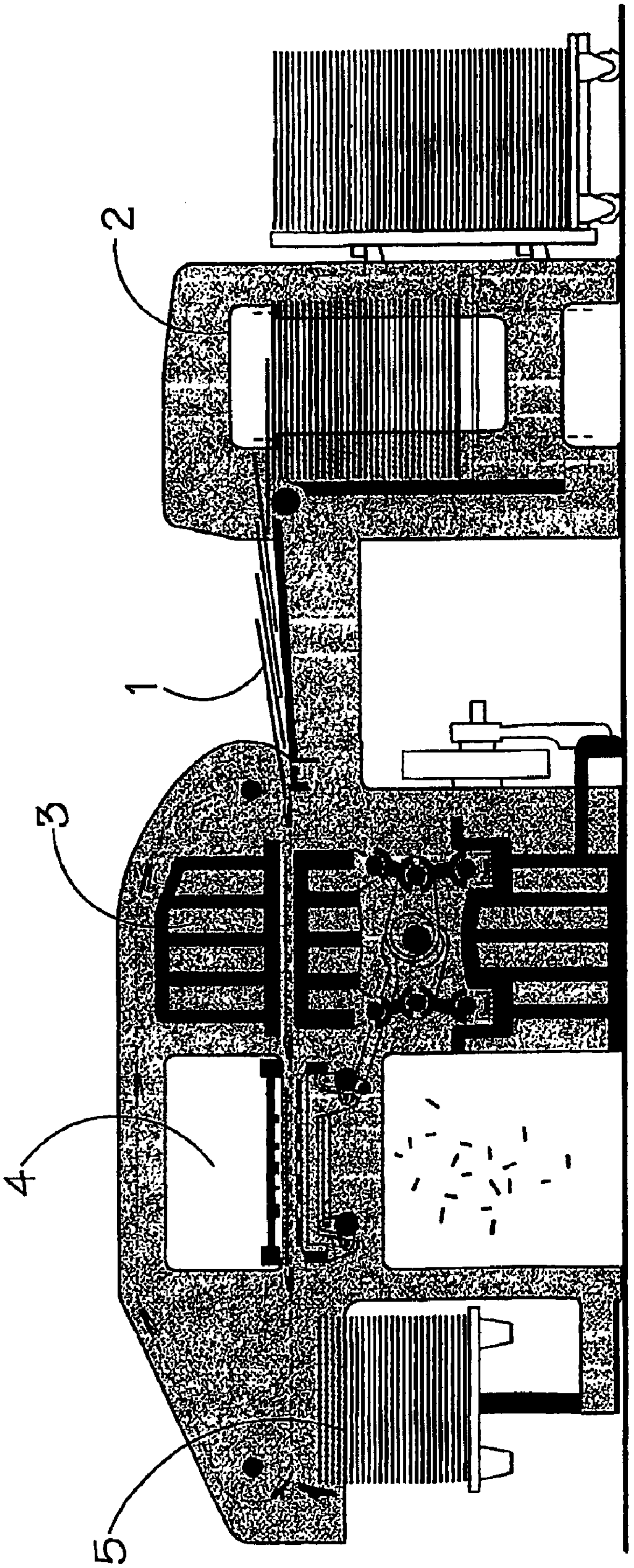
FIG. 17 shows a schematic diagram of the Bobst Autoplaten SP 900-E and its operation.

FIG. 17 shows schematically the operation of an alternative cutting station, the Bobst Autoplaten SP 900-E. Individual sheets of paper 1 are fed from a reservoir 2 to a platen press 3 before proceeding to a stripper 4 which strips out the rough edges and conveys the paper to a storage zone 5. In one process according to the invention, the paper fed to the platen press compresses a multiplicity of, say, 50 sheets of paper and the platen press is configured to cut out the shaped region from each individual sheet but to leave at least one edge uncut through the stripping zone 4 so that the pads arriving at storage reservoir 5 remain uncut along at least one edge to ensure that the notepad stays together during the process.

What is claimed is:

1. A process for manufacturing a notepad comprising:

providing a paper supply; sequentially feeding single pages from said paper supply to a printing and cutting station; printing an image on a pad region of each single page; making at least one irregular cut at an edge of the pad region whilst leaving at least one straight edge of the pad region uncut; collating the printed and cut pages in a stack of desired quantity; cutting the collated stack along the at least one uncut straight edge of the pad region; and gluing the collated stack along any resulting cut straight edge.

2. A process according to claim 1, comprising printing a plurality of identical images at spaced apart pad regions of each single page; making at least one irregular cut at an edge of each spaced apart pad region whilst leaving at least one straight edge of each spaced apart pad region uncut and, after collation, cutting the collated stack along the at least one uncut straight edge of each spaced apart pad region.

3. A process according to claim 1, wherein the stacked pages are collated together with backboards which are correspondingly cut to match the cut pages.

4. A process according to claim 3, wherein the backboards are not printed.

5. A process according to claim 1 comprising the additional step of further cutting the glued collated stack along one or more further uncut straight edges.

6. A process according to claim 1 comprising the additional step of tearing away any waste paper from the region of the irregular cut.

* * * * *